(12) United States Patent
Cheng et al.

(10) Patent No.: US 11,762,560 B2
(45) Date of Patent: Sep. 19, 2023

(54) OPTIMIZING NOC PERFORMANCE USING CROSSBARS

(71) Applicant: Meta Platforms, Inc., Menlo Park, CA (US)

(72) Inventors: Linda Cheng, San Jose, CA (US); Olivia Wu, Los Altos, CA (US); Abdulkadir Utku Diril, Menlo Park, CA (US); Pankaj Kansal, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/543,636

(22) Filed: Dec. 6, 2021

(65) Prior Publication Data

US 2023/0176736 A1 Jun. 8, 2023

(51) Int. Cl.
*G06F 3/06* (2006.01)

(52) U.S. Cl.
CPC .......... *G06F 3/0611* (2013.01); *G06F 3/0635* (2013.01); *G06F 3/0659* (2013.01); *G06F 3/0683* (2013.01)

(58) Field of Classification Search
CPC .... G06F 3/0611; G06F 3/0635; G06F 3/0659; G06F 3/0683; G06F 13/40–4022; G06F 12/0813; G06F 12/0806; G06F 3/06; H04L 49/101; H04L 49/106; H04L 49/1576; G06N 3/02; G06N 3/04; G06N 3/06
See application file for complete search history.

(56) References Cited

U.S. PATENT DOCUMENTS

| | | | |
|---|---|---|---|
| 5,603,046 A * | 2/1997 | Wiles | G06F 15/17337 712/22 |
| 5,832,291 A | 11/1998 | Rosen et al. | |
| 8,612,711 B1 * | 12/2013 | Griffin | G06F 12/0848 710/3 |
| 10,838,787 B2 * | 11/2020 | Dobbs | G06F 13/28 |
| 2018/0006946 A1 * | 1/2018 | Flajslik | H04L 43/062 |

FOREIGN PATENT DOCUMENTS

WO 2020190813 9/2020

OTHER PUBLICATIONS

P.Heywood, S. Maddock, R. Bradley, D. Swain, I.Wright, M. Mawson, G. Fletcher, R. Guichard, R. Himlin, P. Richmond, A data-parallel many-source shortest-path algorithm to accelerate macroscopic transport network assignment, Transportation Research Part C: Emerging Technologies, vol. 104, Jul. 2019 (Year: 2019).*

(Continued)

*Primary Examiner* — Khoa D Doan
(74) *Attorney, Agent, or Firm* — Van Pelt, Yi & James LLP

(57) ABSTRACT

A system including an array of processing elements, a plurality of periphery crossbars and a plurality of storage components is described. The array of processing elements is interconnected in a grid via a network on an integrated circuit. The periphery crossbars are connected to a plurality of edges of the array of processing elements. The storage components are connected to the periphery crossbars.

18 Claims, 3 Drawing Sheets

(56) References Cited

OTHER PUBLICATIONS

K. Sewell et al., "Swizzle-Switch Networks for Many-Core Systems," in IEEE Journal on Emerging and Selected Topics in Circuits and Systems, vol. 2, No. 2, pp. 278-294, Jun. 2012, doi: 10.1109/JETCAS.2012.2193936. (Year: 2021).*
Bhardwaj K., et al., "C3Map and ARPSO Based Mapping Algorithms for Energy-Efficient Regular 3-D NoC Architectures," Technical Papers of 2014 International Symposium on VLSI Design, Automation and Test, IEEE, Apr. 28, 2014, 4 pages.
European Search Report for European Patent Application No. 22211121.3, dated Mar. 9, 2023, 9 pages.

* cited by examiner

OPTIMIZING NOC PERFORMANCE USING CROSSBARS

BACKGROUND

A group of interconnected processing engines may be used in various applications. In some cases, processing engines are organized in a grid and interconnected via a mesh network. A processing engine is at each node of the network. Each processing engine can communicate with the processing engine at every other node of the network. Nodes, and thus processing engines, may also communicate with elements outside of the grid. In this grid configuration, data may be shared between the processing engines in the grid and with other elements surrounding the grid. Use of processing engines interconnected via a mesh network may more readily scale with increases in the number of processing engines.

Although processing engines can be interconnected in a grid, there may be issues with this configuration. Traffic is generally desired to be evenly distributed across the network. Such a distribution may reduce congestion and latency. However, local regions of high traffic may occur in the network. These hotspots in traffic can adversely affect routing of data through the network. Further, there are many possible paths through the network. To improve efficiency, traffic routed through the network is desired to take the shortest path having the lowest latency. This goal may be challenging to achieve in some instances. Consequently, a mechanism for improving routing of traffic for an array of processing engines is desired.

BRIEF DESCRIPTION OF THE DRAWINGS

Various embodiments are disclosed in the following detailed description and the accompanying drawings.

DETAILED DESCRIPTION

Figure 1:
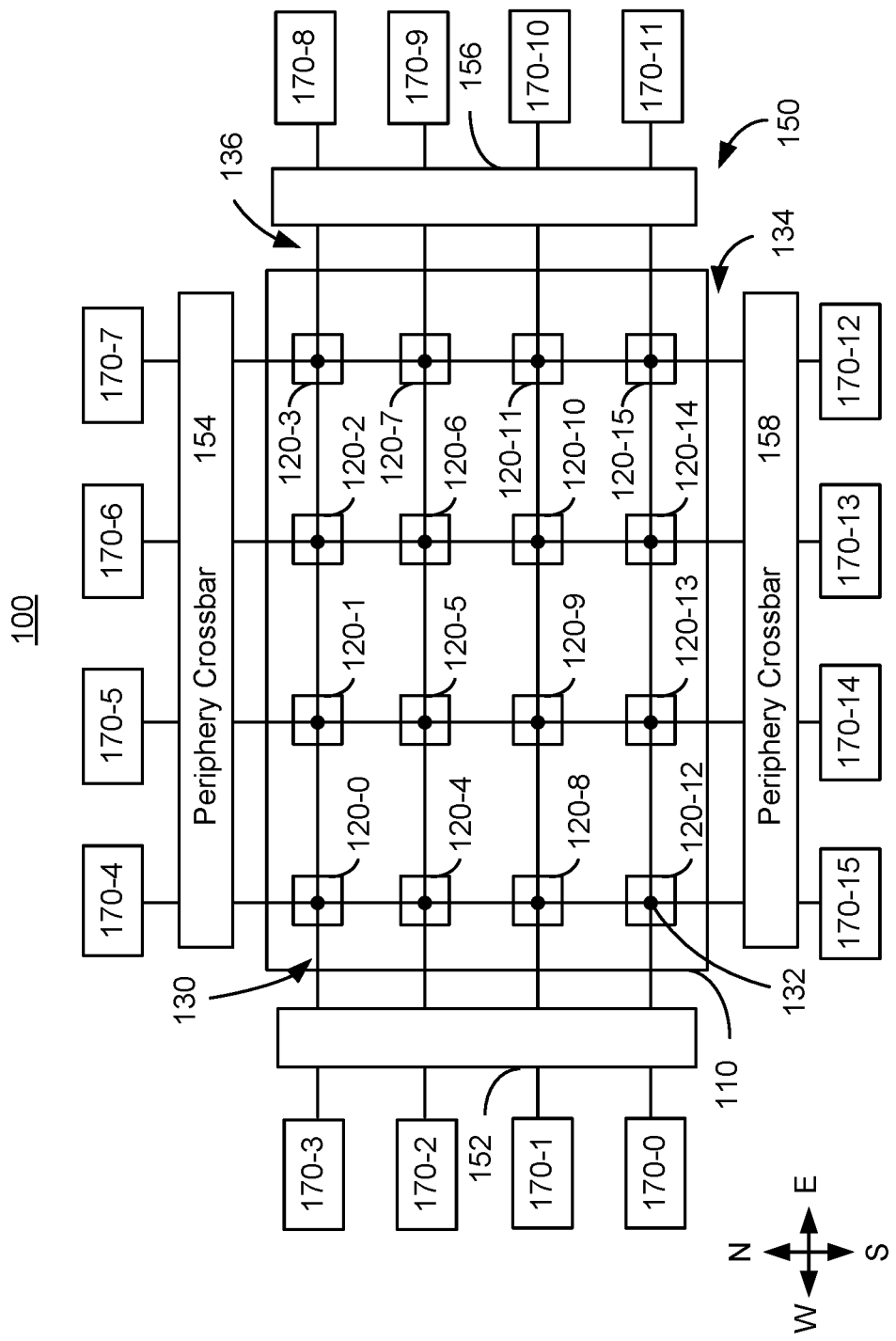
FIG. 1 is a diagram depicting an embodiment of a system that utilizes an array of processing elements.

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the disclosure. The disclosure is described in connection with such embodiments, but is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

In some applications, such as artificial intelligence (AI) inference application specific integrated circuits (ASICS)), a collection of processing engines is used. The processing engines may operate individually or may work together in clusters to perform more complex tasks. In some cases, processing engines are interconnected via a mesh network. A processing engine may be connected to each node of the network. The array of interconnected processing engines may be considered to be a network on a chip (NOC) because each processing engine is coupled to a node in the network and each node can communicate with each other node. Nodes may also communicate with elements outside of the grid of processing engines. In this configuration, data may be reliably shared between elements in and surrounding the grid. Use of such a mesh network also allows for the area and power consumed to grow linearly with increases in the number of processing engines.

Although processing engines can be arranged in a grid, there are drawbacks. For example, traffic is generally desired to be evenly distributed across the network to avoid congestion and reduce latencies. Elements such as memories (e.g. caches), central processing units (CPUs), and other elements used by the processing engines may reside outside of the network. Thus, traffic through the network may be routed not only between processing engines, but also to and from these external elements. Use of external elements outside of the grid may result in local regions of high traffic in portions of the network close to the elements. This variation from evenly distributed traffic adversely affects routing of traffic through the network. In order to traverse the network, there are many possible paths. In order to reduce latencies, traffic routed through the network is desired to take the shortest path having the lowest latency. This may be difficult to achieve in some cases. Consequently, a mechanism for improving routing of traffic for an array of interconnected elements is desired.

A system including an array of processing elements, periphery crossbars and storage components is described. The array of processing elements is interconnected in a grid via a network on an integrated circuit. The periphery crossbars are connected to edges of the array of processing elements. The storage components are connected to the periphery crossbars. In some embodiments, each periphery crossbar is connected to a corresponding edge. Thus, each edge of the array may have a corresponding periphery crossbar. The periphery crossbar may also extend along the entire edge. In some embodiments, the system includes external masters. The external masters may be at corner(s) of the array. The external masters are also connected to one or more of the periphery crossbars. Thus, processing elements, at least some of the storage components, and the external masters may be coupled with the same periphery crossbar(s). Each of the periphery crossbars selects a lane such that data for a processing element in the array of processing elements is routed within the grid along a single direction.

A method for providing a processing system is described. The method includes providing an array of processing elements interconnected in a grid via a network on an integrated circuit. The method also includes providing periphery crossbars connected to edges of the array of processing elements. Storage components connected to the periphery crossbars are also provided. In some embodiments, an external master is also provided. The external master is coupled to at least one of the periphery crossbars. In some embodiments, a memory bridge coupled to the external master is also provided. The memory bridge selects one of the periphery crossbar(s) for routing data from the external master. The periphery crossbar selected corresponds to a minimum path of the data through the grid.

FIG. 1 is a diagram depicting an embodiment of a computing system 100. For clarity only some portions of computing system 100 are shown. System 100 includes an array 110 having processing elements 120-0, 120-1, 120-2, 120-3, 120-4, 120-5, 120-6, 120-7, 120-8, 120-9, 120-10, 120-11, 120-12, 120-13, 120-14, and 120-15 (collectively or generically processing element(s) 120) arranged in a grid. System 100 also includes network 130, periphery crossbars 152, 154, 156, and 158 (collectively or generically periphery crossbar(s) 150), and storage elements 170-0, 170-1, 170-2, 170-3, 170-4, 170-5, 170-6, 170-7, 170-8, 170-9, 170-10, 170-11, 170-12, 170-13, 170-14, and 170-15 (collectively or generically storage element(s) 170). In the embodiment shown, array 110 includes sixteen processing elements 120 interconnected via network 130. Processing elements 120 may be processing engines. For example, processing elements 120 may be used in an AI inference ASICS. In some embodiments, processing elements 120 may be other component(s).

Network 130 is a mesh including nodes 132 (of which only one is labeled) and interconnects that can be considered to be laid out in north-south lanes 134 and east-west lanes 136. Network 130 and thus array 110 of processing elements 120 may be viewed as being laid out in a grid. Although shown as single lines, interconnects of network 130 generally carry multiple lines. For example, a single interconnect may have a data line, a control line, a utility line, and/or other lines. In addition to processing elements 120, a router may be connected at nodes 132 to route traffic through network 130. In some embodiments, such a router performs static routing. In other embodiments, such a router may perform dynamic routing. Each node 132 is coupled to a corresponding processing element 120. Thus, traffic may be routed through network 110 as well as to and from processing elements 120.

Periphery crossbars 150 reside at the edges of array 110. In the embodiment shown, a periphery crossbar 150 is at each edge of array 110. Thus, periphery crossbars 152, 154, 156, and 158 reside at the west, north, east and south edges, respectively, of array 110. For example, crossbars 152 and 156 may be considered to be at opposing edges of array 110. Similarly, crossbars 154 and 158 may also be considered to be at opposing edges of array 110. In the embodiment shown, array 110 is rectangular shape. However, other shapes are possible. In such embodiments, a periphery crossbar analogous to periphery crossbars 150 may be present at each edge of such an array. Further, periphery crossbars 150 are connected with all lanes 134 or 136 of an edge. Thus, periphery crossbars 152 and 156 have a port connect to each lane 136. Periphery crossbars 154 and 158 have a port connected to each lane 134.

Periphery crossbars 150 couple processing elements 120 with storage elements 170. Thus, each periphery crossbar 150 has one type of ports coupled to lanes 134 or 136 (i.e. interconnects) of network 130 at an edge of array 110. Each periphery crossbar 150 has another type of ports coupled to storage elements 170. Periphery crossbars 150 may allow for connectivity between every port in one type of ports (e.g. to/from network 130) with every port in the other type of ports (e.g. to/from storage elements 170). In some embodiments, periphery crossbars 150 also allow for connectivity between ports in the same type (between lanes 134 or 136 of network 130 or between storage elements 170). Thus, periphery crossbars 150 select the appropriate lane 134 or 136 on which to route traffic that is to travel on or through array 110. Periphery crossbars 150 also select the appropriate storage element 170 for traffic for storage elements 170. Computer system 100 may include additional elements. Such elements may also be connected to array 110 and storage elements 170 via periphery crossbars 150. In such embodiments, additional ports may be provided in the corresponding periphery crossbar(s).

Storage elements 170 are coupled to processing elements 120 via periphery crossbars 150. In some embodiments, storage elements 170 are caches. However, other storage elements may be used. Additional elements, such as additional processing elements and/or memories, may be coupled to storage elements 170. For example, caches 170 may service a DDR DRAM (not shown) or other memory. Connections to the additional elements may be made via additional routing elements, such as additional crossbars.

In operation, components of computing system 100 select the appropriate lanes 134 and 136 such that a packet travels along a straight line in array 110 and may have a reduced distance of travel (e.g. a minimum number of hops in some embodiments) within array 110. Periphery crossbars 150 select the appropriate lane 134 or 136 for routing traffic in array 110 such that packets travel on a single lane 134 or 136 (i.e. in a straight line). In some embodiments, periphery crossbars 150 select the appropriate lane 134 or 136 for routing traffic in array 110 such that packets travel a minimum distance (the minimum number of hops between nodes 132) in network 130. More specifically, processing elements 120 retrieve data from one or more storage elements 170. To do so, processing element 120 request data. When routing traffic from storage elements 170 to processing elements 120, periphery crossbars 150 select the lanes 134 or 136 intersecting the processing elements' node in network 130 and that correspond to a single lane of travel and a reduced number of hops. In some embodiments, this is carried out by addressing processing elements 120 based on their location in array 110. For example, x-y (or north/south-east/west) coordinates may be used for processing elements 120 and other components such as storage elements 170. Based on the coordinates, periphery crossbars 150 select the appropriate lane 134 or 136 for traffic to travel.

For example, processing element 120-5 may broadcast a request to fetch data that is stored in storage elements 170-9, 170-10, and 170-11. Data is retrieved from storage elements 170-9, 170-10, and 170-11. Periphery crossbar 156 routes data from storage elements 170 such that the packets travel along a single lane 136. Packets for data from storage elements 170-9, 170-10, and 170-11 travel on the same lane 136 on which processing element 120-5 resides. Thus, the packets travel, in order, from periphery crossbar 156, through node 132 corresponding to processing element 120-7, through node 132 corresponding to processing element 120-6, and to processing element 120-5. Thus, packets from storage elements 170-9, 170-10, and 170-11 travel the same path, through the same (single) lane 136 through network 130 to processing element 120-5. As a result, the minimum number of hops (three in the example above) between nodes 132 is also traveled. Similarly, if processing element 120-5 retrieves data from storage elements 170-12 and 170-13, periphery crossbar 158 selects lane 134 such that data packets travel along a single lane (e.g. in a straight line). This lane 134 intersects node 132 corresponding to processing element 120-5. Thus, packets from storage elements 170-12 and 170-13 travel from periphery crossbar 158, through node 132 corresponding to processing element 120-13, through node 132 corresponding to processing element 120-9, and to processing element 120-5.

Similarly, traffic may be more readily routed from processing elements 120 to storage elements 170 using periphery crossbars 150. Processing elements 120 may simply send traffic along a lane 134 or 136 intersecting the nodes 132 on which processing elements 120 reside to periphery crossbar 150 at the edge of array 110 corresponding to the desired storage element 170. For example, processing element 120-5 may write data to storage element 170-7. Processing element 120-5 sends data along lane 134 intersecting its node 132. Periphery crossbar 154 receives the data and selects storage element 170-7 as the destination. Thus, data from processing element 120-5 travels to node 132 corresponding to processing element 120-1 and to periphery crossbar 154. Periphery crossbar 154 provides the data to destination storage element 170-7. Thus, data packets travel along a straight line in array 110 and thus in network 130. Because traffic from processing elements 120 travels in a straight line, a reduced path length (e.g. the minimum number of hops in some embodiments) may be traversed.

System 100 may have improved performance. Because traffic travels in straight lines and along single lanes 134 or 136 in and through array 100, array 100 may have low latency, high bandwidth, and deadlock free routing of traffic. The speed and efficiency of system 100 may thus be improved. For example, processing elements 120 may be capable of performing a larger number or operations per second. In addition, fewer queues may be used for routers residing at nodes 132. Because traffic is routed in a straight line along a lane 134 or 136, a router at node 132 may include queues for traffic that runs north-to-south, south-to-north, east-to-west, and west-to-east. Queues for traffic that runs north-to-east, east-to-south, south-to-west, west-to-north, north-to-west, west-to-south, south-to-east, and east-to-north may be omitted. Consequently, the design and fabrication of system 100 may be simplified. Analysis of traffic patterns through array 110/network 130 may also be facilitated because traffic travels through array 110/network 130 in straight lines. As a result, modeling may be simplified and latencies of various routes more readily determined. Test cases used to investigate performance of system 100 may be more easily determined. Consequently, performance, fabrication, and use of system 100 may be improved.

Figure 2:
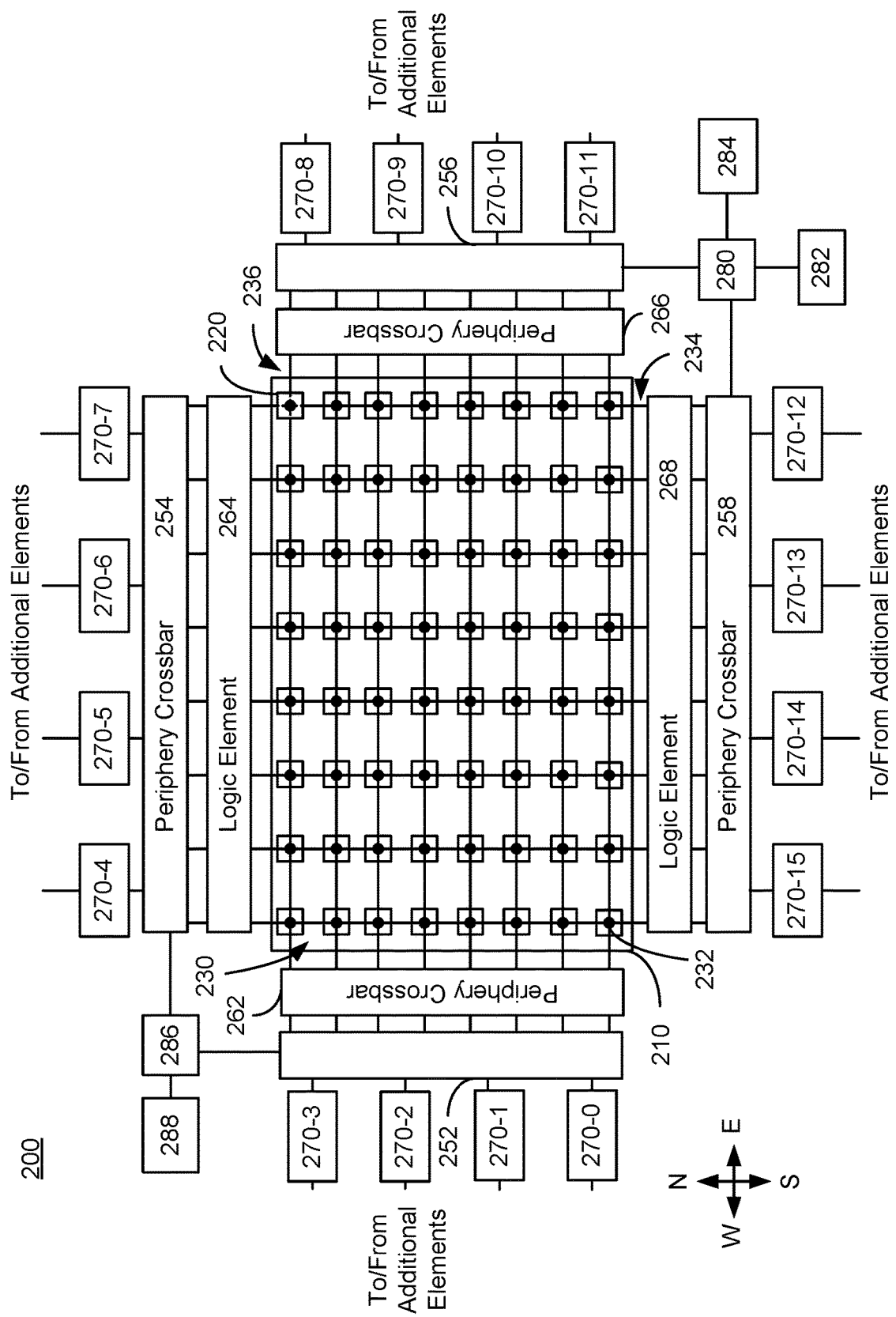
FIG. 2 is a diagram depicting an embodiment of a system that utilizes an array of processing elements.

FIG. 2 is a diagram depicting an embodiment of system 200 that utilizes an array of processing elements. For clarity only some portions of computing system 200 are shown. System 200 is analogous to system 100. Consequently, system 200 includes array 210 having processing elements 220, network 230, periphery crossbars 252, 254, 256, and 258 (collectively or generically periphery crossbar(s) 250), and storage elements 270-0, 270-1, 270-2, 270-3, 270-4, 270-5, 270-6, 270-7, 270-8, 270-9, 270-10, 270-11, 270-12, 270-13, 270-14, and 270-15 (collectively or generically storage element(s) 270) that are analogous to array 110 having processing elements 120, network 130, periphery crossbars 152, 154, 156, and 158, and storage elements 170, respectively. In the embodiment shown, array 210 includes sixty-four processing elements 220 interconnected via network 230. Processing elements 220 may be processing engines. For example, processing elements 220 may be used in an AI inference ASICS. Network 230 is a mesh including nodes 232 (of which only one is labeled) and interconnects that can be considered to be laid out in north-south lanes 234 and east-west lanes 236. Consequently, processing elements 220 in array 210 and network 230 may be considered to be laid out in a grid. In addition to processing elements 220, a router may be connected at nodes 232 to route traffic through network 230. In some embodiments, such a router performs static routing. In other embodiments, such a router may perform dynamic routing. Each node 232 is coupled to a corresponding processing element 220.

System 200 also includes logic elements 262, 264, 266, and 268 (collectively or generically logic element(s) 260) coupled between periphery crossbars 252, 254, 256, and 258, respectively, and processing elements 220. Logic elements 260 may perform various functions, such as not limited to hashing and/or unrolling (separation in to into smaller chunks of data). However, in some embodiments, logic elements 260 may be omitted or replaced with other elements. Also shown are additional elements 280, 282, 284, 286, and 288. In some embodiments, elements 280 and 286 are memory bridges. Elements 282, 284, and 286 are external masters. External masters 282, 284, and 286 may be CPUs and/or other processing elements that perform functions such as coordinating boot up, configuration, debugging, manage the processing elements' workloads, communicating with external devices, decoding, scrambling, and/or other functions. Memory bridge 280 may be used to control communication between periphery crossbars 256 and 258 and external masters 282 and 284. Similarly, memory bridge 286 may control communication between external master 288 and periphery crossbars 252 and 254. Memory bridges 280 and 286 may select the appropriate periphery crossbar 250 for communicating with external masters 282, 284, and 288. Storage elements 270 may be coupled to additional elements (not shown), such as additional storage elements and/or additional processing elements. These connections may be made via crossbars (not shown).

Although periphery crossbars 250 are analogous to periphery crossbars 150, periphery crossbars 250 include three types of ports: one type coupled to array 210/network 230 (via logic elements 260), one type coupled to storage elements 270, and one type coupled to external masters 282, 284, and 288 via memory bridges 280 and 286. In the embodiment shown, periphery crossbars 250 are configured such that a port of a particular type can connect to any port of another type. Thus, each processing element 220 can be coupled to every storage element 270 and every external master 282, 284, and 288 via periphery crossbars 250. Similarly, each storage element 270 can be coupled to every processing element 220 and every external master 282, 284, and 288 via periphery crossbars 250. Each external master 282, 284, and 288 can be coupled to every processing element 220 and every storage element 270 via periphery crossbars 250. In some embodiments, ports of the same type can also be connected. In such embodiments, for example, each storage element 270 may be connected to another storage element 270 connected to the same periphery crossbar 250 through that periphery crossbar 250.

System 200 operates in an analogous manner to system 100. System 200 routes traffic through array 210 in straight lines along a single lane 234 or 236 and/or with a reduced path length. Thus, traffic travels through array 210/network 230 in a manner analogous to how traffic travels in array 110/network 130. Packets travel east-west, west-east, north-south, and south-north. Packets do not travel, for example, north-east, north-west, east-south, east-north, south-east, south-west, west-south, and west-north. Thus, system 200 shares the advantages of system 100.

In addition, system 200 may efficiently route data for other external elements, such as external masters 282, 284, and 288. For communication between external masters 282, 284, and 286 and elements such as storage elements 270 that are outside of array 210/network 230, traffic may be routed partially or completely outside of array 210. Traffic that is routed through array 210/network 230 travels along a single lane 234 or 236. For example, if external master 282 fetches data from storage element 270-8, corresponding memory bridge 280 selects periphery crossbar 256 to receive the request. Storage element 270-8 provides the data to periphery crossbar 256, which sends the data to corresponding memory bridge 280. Memory bridge 280 provides the data to external master 282. Similarly, if external master 282 retrieves data from storage element 270-13, memory bridge 280 provides the request to periphery crossbar 258. Periphery crossbar 258 provides the request to storage element 270-13. Data retrieved from storage element 270-13 is provided by periphery crossbar 258 to memory bridge 280. Memory bridge 280 provides the data to external master 282.

If external master 282 is to communicate with a particular processing element 220 or other storage element 270 via array 210/network 230, memory bridge 280 provides the request to the appropriate periphery crossbar 250 such that the request can be routed along a straight line and within a single lane 234 or 236 within array 210. Thus, the routing may still have a reduced path length (e.g. minimum hops). For example, if external master 282 is to communicate with storage element 270-6, memory bridge 280 provides the request to periphery crossbar 258, which selects the appropriate lane 234 that runs north south (e.g. the third from the east edge of array 210/network 230). The request is sent to periphery crossbar 254, which provides the request to storage element 270-6. Data sent from storage element 270-6 to periphery crossbar 254. Periphery crossbar 254 selects the appropriate lane 234 (e.g. the same lane third from the east edge of array 210) to send data south to periphery crossbar 258. Periphery crossbar 258 provides the data to memory bridge 280, which transfers the data to requesting external master 282.

Communications with processing elements 220 may be carried out in an analogous manner. For example, external master 284 may communicate with processor 220 in the north east corner of array 210 (processing element 220 which is labeled in FIG. 2). Memory bridge 280 may select periphery crossbar 256, for which the path in array 210 is shortest. In another embodiment, memory bridge 280 might select either periphery crossbar 258 or periphery crossbar 256. Periphery crossbar 256 selects lane 236 intersecting processor 220. The traffic is routed from periphery crossbar 256 to processor 220 along a straight line within array 210.

System 200 may share the benefits of system 100. Because traffic travels in straight lines and along single lanes in and through array 210/network 230, array 210 may have low latency, high bandwidth, and deadlock free routing of traffic. The speed and efficiency of system 200 may thus be improved. Routers at nodes 232 may also include fewer queues. Consequently, the design and fabrication of system 200 may be simplified. Analysis of traffic patterns through array 210/network 230 may also be facilitated because traffic travels through array 210/network 230 in straight lines. As a result, modeling may be simplified and latencies of various routes more readily determined and test cases to investigate performance of system 200 may be more easily determined.

Moreover, use of external masters 282, 284, and 286 is facilitated. Communication between storage elements 270 and external masters 282, 284 and 288 that share the same periphery crossbar 250 need not travel through array 210/network 230. Thus, no resources of network 130 need be used for such communication. Bandwidth for network 230/array 210 may thus be conserved. Processing elements 220 may thus experience less congestion when fetching data from or writing data to storage elements 270. If storage elements 270 accessed do not share the same periphery crossbar 250 as external master 282, 284, or 288, then traffic is routed on a single lane 234 or 236 through array 210. Thus, bandwidth may be conserved and areas in proximity to external masters 282, 284 and 288 may not experience high congestion. Thus, traffic may be more evenly spread through array 210/network 230. Consequently, performance, fabrication, and use of system 200 may be improved.

Figure 3:
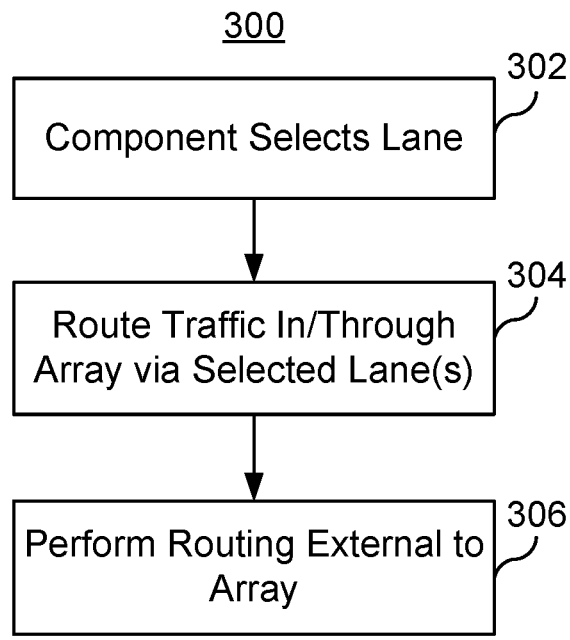
FIG. 3 is a flow-chart depicting an embodiment of a method for routing traffic through an array of processing elements.

FIG. 3 is a flow-chart depicting an embodiment of method 300 for routing traffic through the mesh network. Method 300 may include additional steps, including substeps. Although shown in a particular order, steps may occur in a different order, including in parallel. A component selects a lane of the network for routing traffic, at 302. The lane selected is such that the traffic travels in a single lane to its destination and may have a reduced path length. Traffic is routed within or through the array on the selected lane, at 304. Any routing external to the array is performed, at 306. For communications originating outside of the array, 306 is performed prior to 302 and 304. In some embodiments, for communication that occurs outside of the grid only, 302 and 304 may be omitted.

For example, method 300 may be used in conjunction with system 200. For communications to processing elements 220, external routing to a periphery crossbar 250 from storage element 270 or external master 282, 284, or 286 is performed first, at 306. Periphery crossbar 250 selects the appropriate lane 234 or 236, at 302. The lane 234 or 236 selected at 302 intersects the destination processing element 220. Traffic is then routed to the destination processing element 220, at 304. In another example, external master 282 may communicate with storage element 270-12 (or additional elements not shown in FIG. 2) connected to the same periphery crossbar 258. Traffic is routed between external master 282, memory bridge 280, periphery crossbar 258, and storage element 270-12. Thus, traffic does not traverse array 210/network 230.

Thus, using method 300 traffic may be efficiently routed in a system including periphery crossbars and a mesh network. Thus, performance, fabrication, and use of such a system may be improved.

Figure 4:
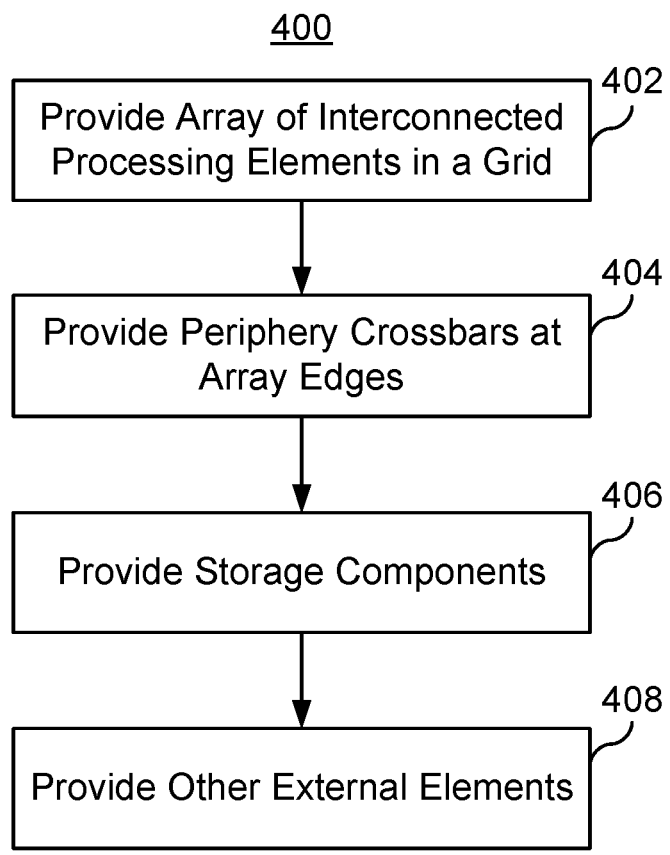
FIG. 4 is a flow chart depicting an embodiment of a method for providing a system that includes an array of processing elements.

FIG. 4 is a flow chart depicting an embodiment of a method for providing a system that utilizes an array of processing elements. Method 400 may include additional steps, including substeps. Although shown in a particular order, steps may occur in a different order, including in parallel.

An array of processing elements that are interconnected via a network are provided, at 402. 402 may include providing a mesh network including interconnects (lanes), nodes, and routers for the nodes. The processing elements are also connected to the nodes, at 402. The processing elements and network may be part of an integrated circuit. Thus, a grid including a network and processing elements is formed. In some embodiments, additional components, such as logic elements, are also provided at 402.

Periphery crossbars are provided at the edges of the array, at 404. Each periphery crossbar provided at 404 include a ports for each lane (interconnect) of the array/network intersecting the corresponding edge. In some embodiments, each edge of the array has a corresponding crossbar provided at 404. Further, the periphery crossbars may be connected to all lanes on each edge.

Storage components are provided, at 406. The storage components are connected to the periphery crossbars. Thus, the periphery crossbars can route data between the array of processing elements and the storage components.

In some embodiments, other external elements are provided, at 408. These elements are also coupled to the periphery crossbars. For example, external masters, memory bridges, additional memory, and/or additional crossbars are also provided. These external elements also access processing elements and/or the grid via the corresponding periphery crossbar.

For example, processing elements 220, array 210, and network 230 are provided at 402. Logic elements 260 may also be provided at 402. Periphery crossbars 250 are provided at 404. Periphery crossbars 250 are coupled to lanes 234 and 236 of array 210/network 230. Storage elements 270 are provided, at 406. Thus, storage components 270 are coupled to ports of periphery crossbars 250. Other external elements are provided, at 408. For example, memory bridges 280 and 286 and external masters 282, 284, and 288 are provided at 408. The external elements are also coupled, directly or indirectly, to periphery crossbars 250.

Thus, using method 400, a system including a grid of processing elements, a corresponding mesh network, periphery crossbars at the edges of the grid, and storage elements are provided. External components such as external masters are also provided. A system having the benefits of system 100 and/or 200 may thus be fabricated.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A system, comprising:
an array of processing elements interconnected in a grid via a network on an integrated circuit, the array including a plurality of lanes on an edge of a plurality of edges;
a plurality of periphery crossbars connected to the plurality of edges of the array of processing elements, the edge corresponding to a periphery crossbar of the plurality of periphery crossbars, the periphery crossbar being connected to the plurality of lanes, the periphery crossbar being configured to select a single lane of the plurality of lanes such that data for a processing element in the array of processing elements is routed within the array along the single lane; and
a plurality of storage components connected to the plurality of periphery crossbars.

2. The system of claim 1, wherein each of the periphery crossbars is connected to a corresponding edge of the plurality of edges; and
wherein each of the plurality of storage components is connected to a corresponding one of the plurality of periphery crossbars.

3. The system of claim 1, wherein the periphery crossbar selects the single lane of the plurality of lanes such that the data for a processing element in the array of processing elements is routed within the array along a single direction.

4. The system of claim 1, wherein the periphery crossbar selects a lane of the plurality of lanes such that the data for the processing element in the array of processing elements is routed within the array utilizing a minimum number of hops in the network.

5. The system of claim 1, wherein at least one periphery crossbar of the plurality of periphery crossbars is coupled to an external master.

6. The system of claim 5, wherein a portion of the plurality of storage components is connected to the at least one periphery crossbar and wherein the at least one periphery crossbar is configured to route data from the portion of the plurality of storage components to the external master outside of the array.

7. A system comprising:
an array of processing elements interconnected in a grid via a network on an integrated circuit:
a plurality of periphery crossbars connected to a plurality of edges of the array of processing elements, at least one periphery crossbar of the plurality of periphery crossbars being coupled to an external master;
a plurality of storage components connected to the plurality of periphery crossbars, a portion of the plurality of storage components is connected to the at least one periphery crossbar and wherein the at least one periphery crossbar is configured to route data from the portion of the plurality of storage components to the external master outside of the array; and
a memory bridge coupled to the external master, the memory bridge selecting a periphery crossbar of the at least one periphery crossbar for routing the data from the external master, the periphery crossbar corresponding to a minimum path of the data through the array.

8. A system, comprising:
an array of processing elements interconnected in a grid via a network on an integrated circuit, the array having a plurality of edges and a plurality of lanes connecting opposing edges of the plurality of edges;
a plurality of periphery crossbars connected to the plurality of edges;
a plurality of storage components, a first portion of the storage components being connected to a corresponding one of the plurality of periphery crossbars; and
a plurality of external masters residing at a corner of the array and connected to at least one periphery crossbar of the plurality of periphery crossbars, a second portion of the plurality of storage components being coupled with the at least one periphery crossbar;
wherein the plurality of periphery crossbars selects a lane of the plurality of lanes such that data for a processing elements in the array of processing elements is routed within the array along a single direction.

9. The system of claim 8, wherein the at least one periphery crossbar is configured to route data between the portion of the plurality of storage components and the external master outside of the array.

10. The system of claim 9, further comprising:
at least one memory bridge coupled to the plurality of external masters, the at least one memory bridge selecting a periphery crossbar of the at least one periphery crossbar for routing data from the plurality of external masters, the periphery crossbar corresponding to a minimum path of the data through the array.

11. The system of claim 9, wherein the plurality of periphery crossbars selects the lane such that the data is routed within the array utilizing a minimum number of hops in the network.

12. A method, comprising:
providing an array of processing elements interconnected in a grid via a network on an integrated circuit, the grid including a plurality of lanes on an edge of a plurality of edges;
providing a plurality of periphery crossbars connected to the plurality of edges of the array of processing elements, the edge corresponding to a periphery crossbar of the plurality of periphery crossbars, and wherein providing the plurality of periphery crossbars further includes connecting the periphery crossbar to the plurality of lanes;
configuring the periphery crossbar to select a single lane of the plurality of lanes such that data for a processing element in the array of processing elements is routed within the array along the single lane; and
providing a plurality of storage components connected to the plurality of periphery crossbars.

13. The method of claim 12, wherein the providing the plurality of periphery crossbars includes:
coupling each of the periphery crossbars to a corresponding edge of the plurality of edges; and
wherein the providing the plurality of storage components further includes coupling each of the plurality of storage components to a corresponding one of the plurality of periphery crossbars.

14. The method of claim 12, wherein providing the plurality of periphery crossbars further includes:
configuring the periphery crossbar to select the single lane of the plurality of lanes such that the data for a processing element in the array of processing elements is routed within the array along a single direction.

15. The method of claim 12, wherein providing the plurality of periphery crossbars further includes:
configuring the periphery crossbar to select a lane of the plurality of lanes such that the data for the processing element in the array of processing elements is routed within the array utilizing a minimum number of hops in the network.

16. The method of claim 12, further comprising:
providing an external master; and
wherein the providing the plurality of periphery crossbars further includes coupling at least one periphery crossbar of the plurality of periphery crossbars to the external master.

17. The method of claim 16, wherein the providing the plurality of storage components further includes:
connecting a portion of the plurality of storage components to the at least one periphery crossbar; and
wherein the providing the plurality of periphery crossbars further includes configuring the at least one periphery crossbar to route data from the portion of the plurality of storage components to the external master outside of the array.

18. A method comprising:
providing an array of processing elements interconnected in a grid via a network on an integrated circuit;
providing a plurality of periphery crossbars connected to a plurality of edges of the array of processing elements;
providing an external master;
providing a plurality of storage components connected to the plurality of periphery crossbars, the providing the plurality of storage components further including connecting a portion of the plurality of storage components to at least one periphery crossbar; and
wherein the providing the plurality of periphery crossbars further includes coupling the at least one periphery crossbar of the plurality of periphery crossbars to the external master;
configuring the at least one periphery crossbar to route data from the portion of the plurality of storage components to the external master outside of the array; and
providing a memory bridge coupled to the external master, the memory bridge selecting a periphery crossbar of the at least one periphery crossbar for routing the data from the external master, the periphery crossbar corresponding to a minimum path of the data through the grid.

* * * * *